(12) United States Patent
Szpak

(10) Patent No.: US 8,813,936 B2
(45) Date of Patent: Aug. 26, 2014

(54) FORCE TRANSMITTING ASSEMBLY

(75) Inventor: Gerald Matthew Szpak, North Royalton, OH (US)

(73) Assignee: Eaton Corporation, Cleveland, OH (US)

( * ) Notice: Subject to any disclaimer, the term of this patent is extended or adjusted under 35 U.S.C. 154(b) by 1557 days.

(21) Appl. No.: 12/220,515

(22) Filed: Jul. 25, 2008

(65) Prior Publication Data

US 2010/0018831 A1   Jan. 28, 2010

(51) Int. Cl.

| | |
|---|---|
| F16D 55/224 | (2006.01) |
| F16D 65/22 | (2006.01) |
| F16D 59/02 | (2006.01) |
| F16D 65/18 | (2006.01) |
| F16D 65/12 | (2006.01) |
| F16D 25/0635 | (2006.01) |
| F16D 55/30 | (2006.01) |
| F16D 65/02 | (2006.01) |
| F16D 55/00 | (2006.01) |
| F16D 121/12 | (2012.01) |

(52) U.S. Cl.
CPC ...... *F16D 65/127* (2013.01); *F16D 2065/1312* (2013.01); *F16D 59/02* (2013.01); *F16D 65/186* (2013.01); *F16D 2055/0058* (2013.01); *F16D 25/0635* (2013.01); *F16D 55/30* (2013.01); *F16D 2121/12* (2013.01)
USPC .......... 192/85.37; 188/270; 192/85.4

(58) Field of Classification Search
USPC .......... 192/66.31, 70.16, 70.19, 70.27, 70.28, 192/85.33, 85.37, 85.4, 89.2, 89.26; 188/71.4, 71.5, 170
See application file for complete search history.

(56) References Cited

U.S. PATENT DOCUMENTS

| | | | | |
|---|---|---|---|---|
| 2,698,676 A | | 1/1955 | Eason | 188/170 |
| 3,410,371 A | * | 11/1968 | Burnett | 188/71.8 |
| 3,552,533 A | * | 1/1971 | Nitz et al. | 192/107 M |
| 3,637,053 A | * | 1/1972 | Boyles | 188/71.1 |
| 3,782,516 A | * | 1/1974 | Frisby et al. | 192/85.09 |
| 4,790,413 A | | 12/1988 | Meynier | 188/18 A |
| 4,863,000 A | * | 9/1989 | Patel | 188/170 |
| 5,010,985 A | | 4/1991 | Russell et al. | 188/218 |
| 5,046,593 A | * | 9/1991 | Collins et al. | 192/18 A |
| 5,257,684 A | * | 11/1993 | Collins | 192/18 A |

(Continued)

FOREIGN PATENT DOCUMENTS

| | | | | |
|---|---|---|---|---|
| EP | 0356793 A1 | 8/1989 | | F16D 55/24 |
| EP | 1918607 A1 | 10/2007 | | F16D 67/04 |
| WO | WO2007/094073 A1 | 8/2007 | | F16D 55/28 |

OTHER PUBLICATIONS

Double Disc, double performance, Feb. 3, 2007.

(Continued)

*Primary Examiner* — Gene Crawford
*Assistant Examiner* — Terry Chau
(74) *Attorney, Agent, or Firm* — Daniel S. Kalka

(57) ABSTRACT

A force transmitting assembly 20 transmits force to engage and disengage a driven shaft 28. When the force transmitting assembly 20 is engaged, front and rear annular pressure plates 32, 34 frictionally retain a rotor 36 fixedly mounted on the shaft 28 and stops rotation of the shaft 28. The force transmitting assembly 20 maximizes torque and minimizes inertia by providing friction surfaces with friction material substantially engaging the entire working surface of the rotor 36. The force transmitting assembly includes an axially moveable housing 22 attached directly to a mounting flange 24.

13 Claims, 8 Drawing Sheets

(56) References Cited

U.S. PATENT DOCUMENTS

| | | | | |
|---|---|---|---|---|
| 5,383,544 | A | 1/1995 | Patel | 192/70.28 |
| 5,577,581 | A * | 11/1996 | Eberwein et al. | 192/18 A |
| 6,318,511 | B1 | 11/2001 | Clement et al. | 188/71.6 |
| 6,609,601 | B2 | 8/2003 | Vogt | 192/70.19 |
| 6,637,568 | B2 * | 10/2003 | Latsko | 192/18 A |
| 7,204,356 | B2 | 4/2007 | Fox | 92/70.13 |
| 7,374,027 | B2 | 5/2008 | Mayberry et al. | |
| 7,556,128 | B2 | 7/2009 | Mayberry et al. | |
| 7,591,349 | B2 | 9/2009 | McConkie et al. | |
| 2008/0110708 | A1 | 5/2008 | Mayberry et al. | |
| 2008/0185239 | A1 | 8/2008 | Hakon et al. | |
| 2009/0133974 | A1 | 5/2009 | Mayberry et al. | |
| 2013/0256077 | A1 * | 10/2013 | More | 192/66.32 |

OTHER PUBLICATIONS

Industrial Clutch the Power of Experience Clutches, Brake, Controls & Hydraulics, 2001.
Airflex DBA, DBB, DBBS, and DC Descriptions, 1997.
European Search Report.

* cited by examiner

FORCE TRANSMITTING ASSEMBLY

BACKGROUND OF THE DISCLOSURE

The present disclosure relates in general to a force transmitting assembly and in particular to an annular brake or clutch assembly with a floating housing to transmit force to retain the shaft against rotation when employed as a brake or to transmit rotation when employed as a clutch.

The term force transmitting assembly as employed herein is intended to refer to an assembly capable of functioning as either a clutch or a brake. These types of assemblies are also referred to herein as a clutch-brake assembly. While the present disclosure is particularly suited for use as a brake assembly and will be described in detail with reference to that application, it should be immediately apparent that it is equally capable of functioning as a clutch, a brake, or more simply referred to as a force transmitting assembly. The term force transmitting assembly will be used herein interchangeably with the term annular brake assembly.

Known clutch-brake assemblies have previously been connected with a shaft to control power transmission. These known clutch-brake assemblies have been utilized in association with can-making machines, press drives, and shear drives, as well as other machines. Known clutch-brake assemblies are disclosed in U.S. Pat. Nos. 5,046,593; 5,257,684; 5,577,581; and 6,637,568.

When machines have different operating characteristics, the force transmitting capability of a clutch-brake assembly must correspond to the operating characteristics of the machine with which the clutch-brake assembly is utilized. Thus, a first machine may require the transmission of relatively large forces to rotate a shaft and to retain the shaft against rotation, yet another machine may require smaller forces to rotate the shaft and retain the shaft against rotation. Accordingly the size and torque of these devices will vary with application.

While the annular brake assembly of the present disclosure may be used in any application that requires a braking force, it is particularly suited in industrial applications as a brake for each of the electric motors in an electric dragline or shovel in the mining and construction industries. In these types of applications, rotors are continuously accelerating in one direction, stopping and accelerating in the opposite direction. The rotors are rotating back and forth with the motor shafts during operation. Lower inertia value of rotating components means faster cycle time which means more production.

Thus, there still exists a need for a brake assembly that can minimize inertia and maximize torque in these and other applications.

BRIEF SUMMARY OF THE DISCLOSURE

The present disclosure relates to a force transmitting assembly which minimizes inertia and maximizes torque. Friction material is in contact with substantially all of the working surface of a rotor in order to optimize the torque-to-inertia ratio. The friction material may be mounted on pressure plates clamping on the rotor, or alternatively mounted on the rotor itself. The force transmitting assembly includes an axially moveable housing attached to a stationary mounting flange. A central opening through the mounting flange and housing receives a driven shaft. The housing contains a rotor fixedly attached to the shaft. The housing includes front and rear annular pressure plates with friction surfaces disposed on each side of the rotor. The annular pressure plates are axially movable for releasing the driven shaft for rotation and for compressing the front and rear annular pressure plates against the rotor for braking action.

In one embodiment a plurality of springs urge the front and rear annular pressure plates for braking action. Other embodiments may include other biasing devices to move the pressure plates such as a pneumatic or hydraulic piston and cylinder.

The various features of novelty which comprise the present disclosure are pointed out with particularity in the claims annexed to and forming a part of this disclosure. For a better understanding of the instant disclosure, reference is made to the accompanying drawings and descriptive matter in which a preferred embodiment is shown and described.

BRIEF DESCRIPTION OF THE DRAWINGS

The foregoing and other features of the invention will become more apparent upon a consideration of the following description taken in connection with the accompanying drawings wherein.

DETAILED DESCRIPTION

Figure 1:
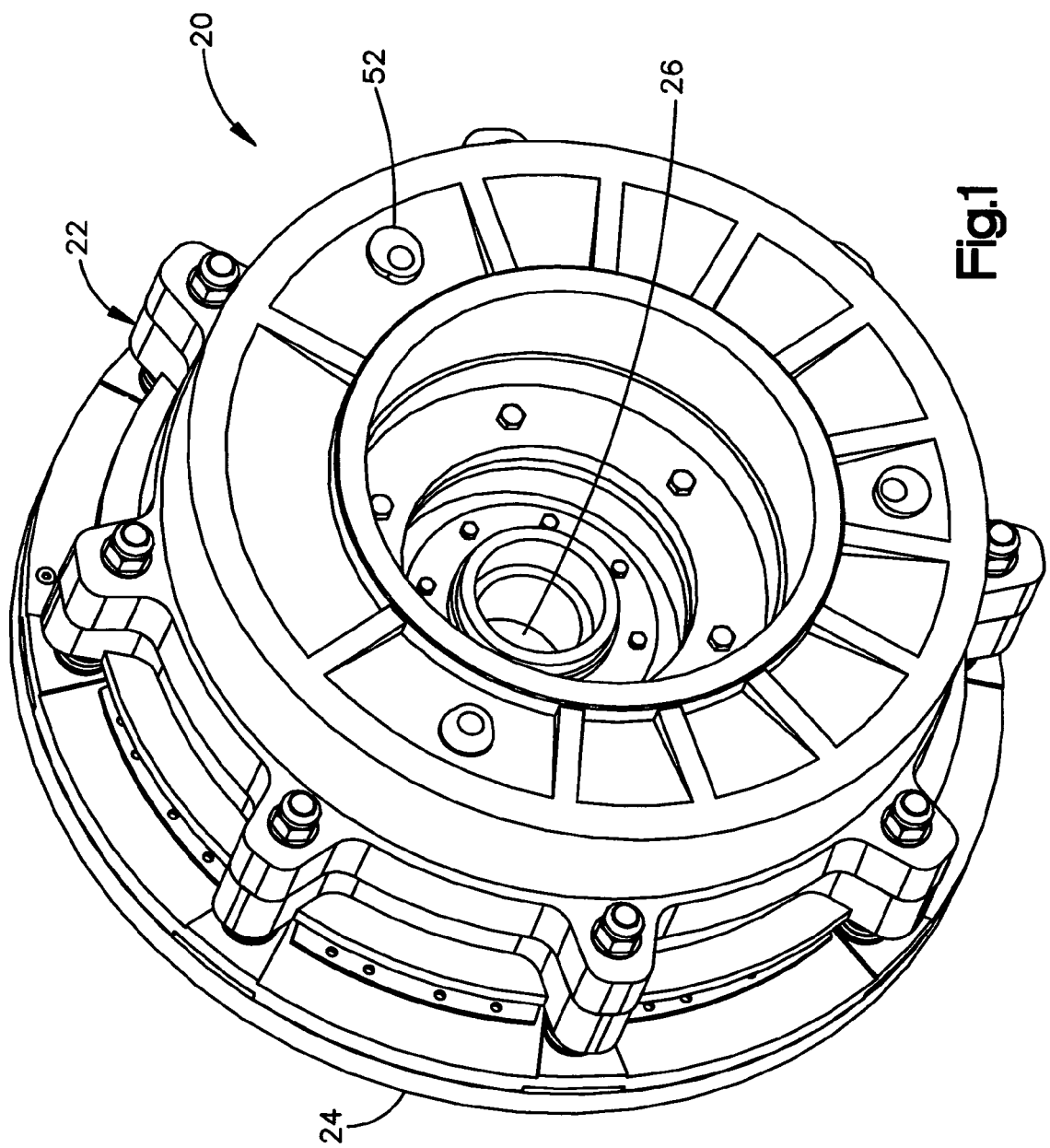
FIG. 1 is an elevated perspective view of an annular brake assembly according to the present disclosure.

An annular brake assembly, generally designated 20, shown in FIG. 1 is operable between a first disengaged condition or non-braking mode and a second engaged condition or braking mode. When the annular brake assembly 20 is in the disengaged condition, the brake assembly 20 releases frictional force from a driven shaft. When the brake assembly 20 is in the second engaged condition, the brake assembly 20 is effective to retain the shaft against rotation.

The annular brake assembly 20 according to the present disclosure addresses several shortcomings with the prior art brake assemblies. In particular, the prior art brake assemblies utilize splined hubs to provide axial freedom for the rotor on the shaft. As the splines wear, the disk becomes imbalanced and exhibits other wear problems. The splined hubs are expensive to manufacture and replace besides presenting issues with the down time involved in the repair process.

In contrast to these prior art devices, the annular brake assembly 20 of the present disclosure employs a rotor fixedly attached to the driven shaft as will be described in much greater detail later herein. The structure of the brake assembly 20 according to the present disclosure further allows the friction material to be replaced without complete disassembly as in the prior art brake assemblies.

First referring to FIG. 1, the annular brake assembly generally designated 20 comprises an axially moveable housing 22 with a limited range of axial movement connected to a stationary mounting flange 24. Mounting flange 24 is attached to the frame of a motor or machine, such as a press machine, for example. The housing 22 and mounting flange 24 have a central opening 26 for receiving a rotatable shaft 28

(shown in FIG. 7) driven by a motor 30 or other machine. The housing 22 includes axially moveable front and rear annular pressure plates 32, 34 with friction surfaces situated on each side of a rotor 36 for applying and releasing a clamping load on the rotor 36. Rotor 36 is fixedly connected to the shaft 28 and rotates therewith. An array of helical coil springs 38 are employed to actuate a front annular pressure plate 32 into the braking mode which applies force to the pressure plates 32, 34 for a clamping load against the rotor 36. As chamber 43 is filled with pressurized air, the front annular pressure plate 32 moves with the cylinder 42 in a first direction as seen by arrow A. A plurality of radial passages 46 in the outer regions of the cylinder 42, piston 40, front and rear pressure plates 32, 34, and the mounting flange 24 are axially aligned to receive guide rods 44 with threads at each end and fasteners 45 connect and hold these components together. The term "floating housing" as employed herein is intended to refer to the axially moveable components of housing 22 which are the front and rear annular pressure plates 32, 34, the array of helical coil springs 38, the annular piston 40, and the cylinder 42. Another embodiment of the present disclosure may include air or hydraulic pressure to apply the clamping force on the rotor and utilizing the array of springs to disengage or release the clamping force. This embodiment may be utilized in automotive, truck or other vehicle applications.

Figure 7:
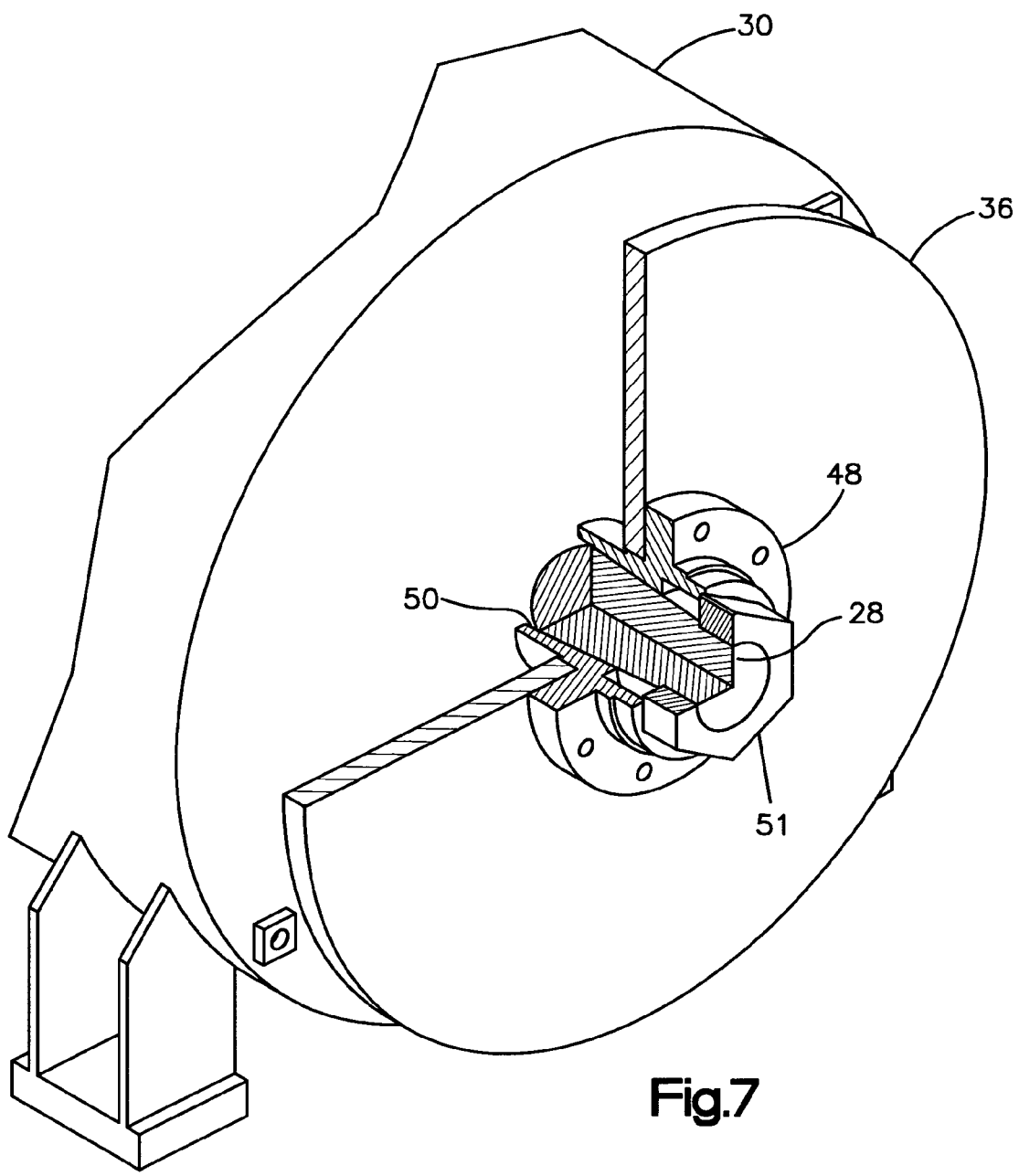
FIG. 7 is a partial sectional illustrational view of the rotor fixedly mounted on the shaft of a motor.
Figure 8C:
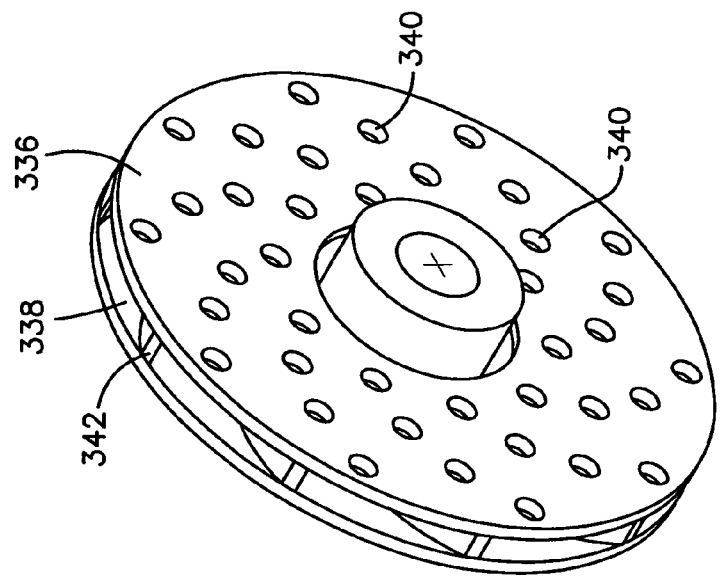
FIGS. 8A-8C illustrate other embodiments of the rotor.
Figure 8B:
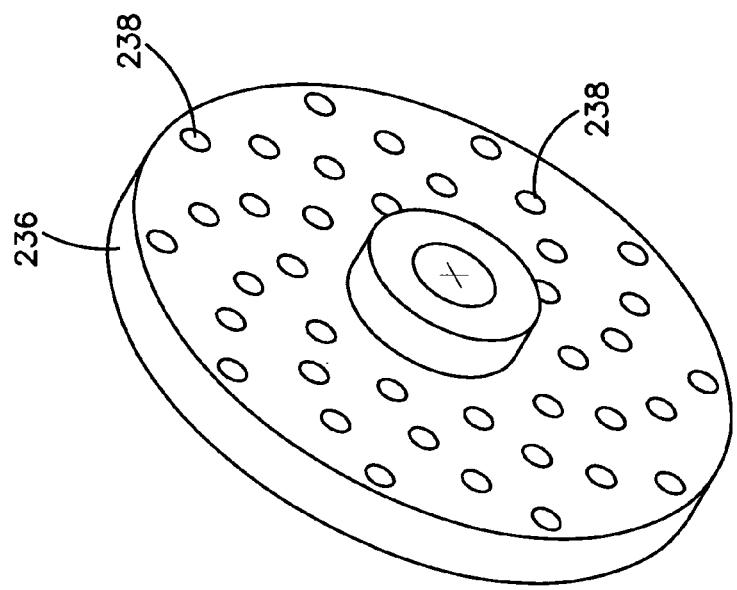
Figure 8A:
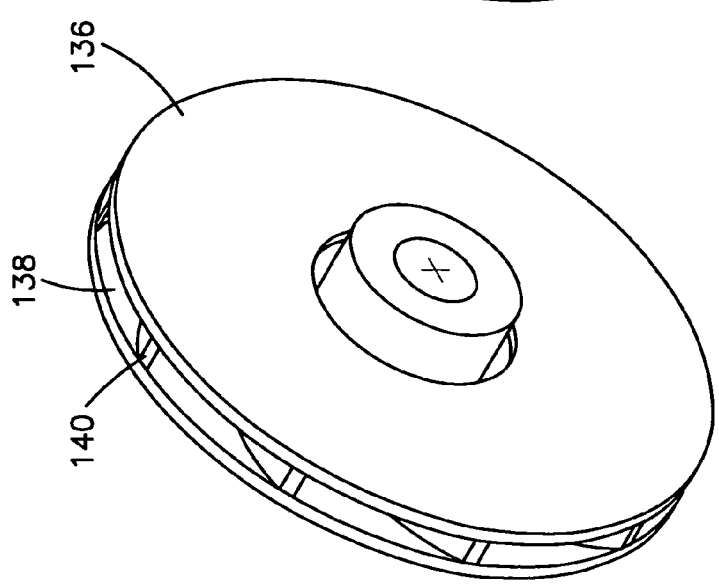

Rotor 36 has a generally cylindrical form and preferably includes a centrally located hub 48 with a bore 50 for positioning on shaft 28. Hub 48 may be an integral part of rotor 36 and cast as one piece together, or separately attached with fasteners to rotor 36. Rotor 36 rotates with shaft 28 relative to the components of the housing 22 which are axially moveable in a limited range. Rotor 36 has a planar surface on each side making up a working surface area for frictional engagement. In one embodiment, the bore 50 in hub 48 is tapered and is received on a correspondingly tapered shaft 28 from the motor 30 as best illustrated in FIG. 7. The rotor 36 is held firmly in place to the shaft 28. A suitable fastener, like a nut 51 or a similar locking device is threaded on the end of the shaft 28. An alternate embodiment includes retaining the rotor 36 with a known keyless locking bushing or nut to a straight shaft 28. Turning next to FIGS. 8A through 8C, there are depicted various embodiments of the rotor 36 designated 136, 236, and 336. Rotor 136 includes an annular gap 138 with reinforcement ribs 140. Gap 138 and reinforcement ribs 140 dissipate generated heat from the braking action and prolongs the operating life of the rotor. Rotor 236 has a solid metal construction with a plurality of openings 238 therethrough used to cool and to allow debris and gases to escape from the braking action. Rotor 336 combines the features of rotor 136 and rotor 236 by providing both the annular gap 338 and the plurality of openings 340 with the supporting ribs 342 to allow debris and gas to escape and heat dissipation during the braking mode.

Figure 2:
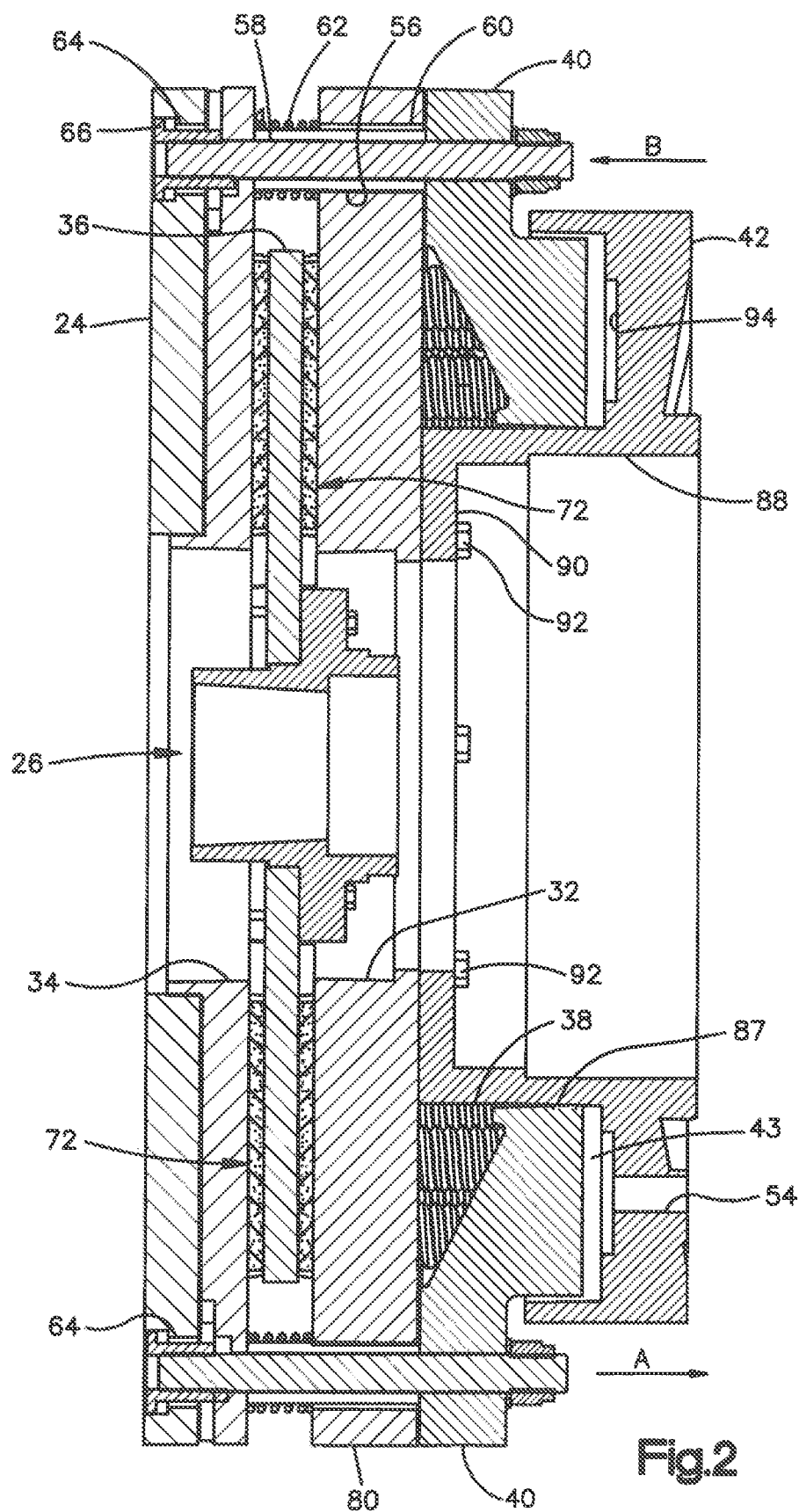
FIG. 2 is a sectional view of the annular brake assembly of FIG. 1.

In the embodiment shown in the Figures, when there is fluid pressure on the annular brake assembly 20, the brake is in the disengaged condition. A suitable fluid for pressurizing the brake assembly includes air conducted from a fluid source, such as an air compressor (not shown), a device well known in the art. The air passes through a solenoid operated valve similar to that described in U.S. Pat. No. 6,637,568, which is owned by the assignee of the present invention and hereby incorporated by reference, into fluid connectors 52 on cylinder 42 which are in fluid communication through passages 54 with a variable volume annular fluid chamber 43 as best seen in FIG. 2. As chamber 43 is filled with pressurized air, the front annular pressure plate 32 moves with the cylinder 42 in a first direction as seen by arrow A. This is the non-braking mode or condition and the rotor 36 freely rotates with shaft 28. As cylinder 42 moves in the direction of arrow A, the pressure plate 32 which is attached pushes against the array of helical coil springs 38 and the annular piston 40. This releases any clamping load on the rotor 36 from the front annular pressure plate 32. Simultaneously, when the air pressure is being applied, the return springs 62 causes the rear annular pressure plate 34 to move against the mounting flange 24 releasing the clamping load on the rotor 36 by the rear annular pressure plate 34. In this mode of operation, the brake assembly 20 is in the disengaged condition or non-braking mode. When the air pressure is evacuated from chamber 43, springs 38 apply force to the front pressure plate 32 causing it to move in the second direction as seen by arrow B. An opposite force to the rear pressure plate 34 results in rear annular pressure plate 34 placing a clamping load on or compressing the rotor 36 for the braking action or braking mode. The brake assembly 20 is now in the engaged condition or braking mode. As mentioned earlier, other embodiments can reverse this by making the air or hydraulic pressure apply the braking force and the springs releasing the braking force.

Although the annular brake assembly 20 may be associated with press forming machines or electric draglines, it is contemplated that the brake assembly will be utilized in association with other known machines requiring acceleration and deceleration of components of the machine and relatively high disengaging and engaging frequencies functioning either as a clutch, a brake, or both. Other machines with which the brake assembly 20 may be associated with, for example, include a press machine, and/or shear drive. The machines may be single stroke or continuous-running machines. Other examples include automotive applications, metal stamping machines, wire processing machines, thread rolling machines, veneer-cutting machines, bottle sorting machines, paper processing machines or textile machines. Of course, it should be understood that the brake assembly 20 may be associated with many other known types of machines if desired.

Figure 3:
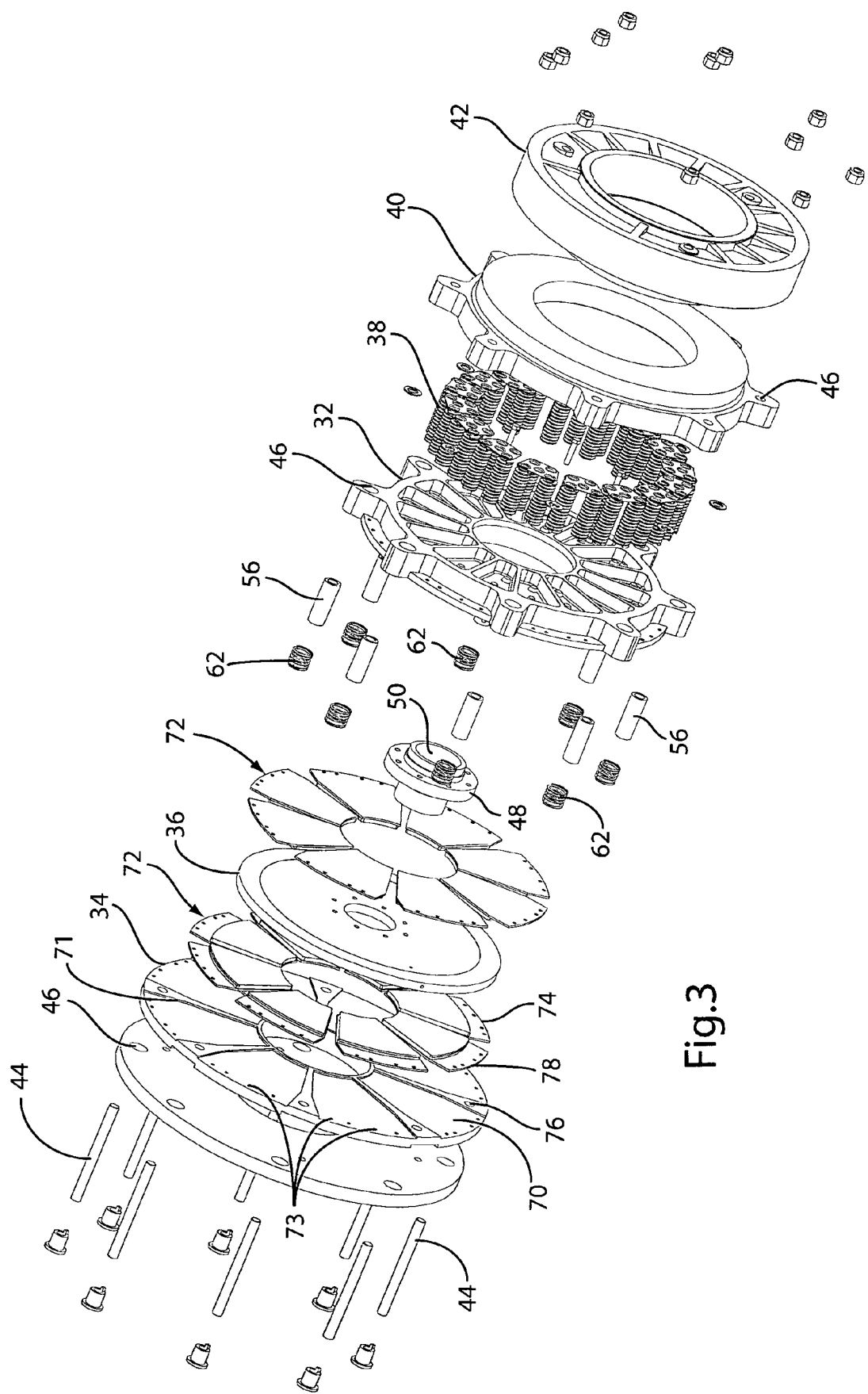
FIG. 3 is an exploded view of the annular brake assembly of FIGS. 1 and 2.
Figure 4:
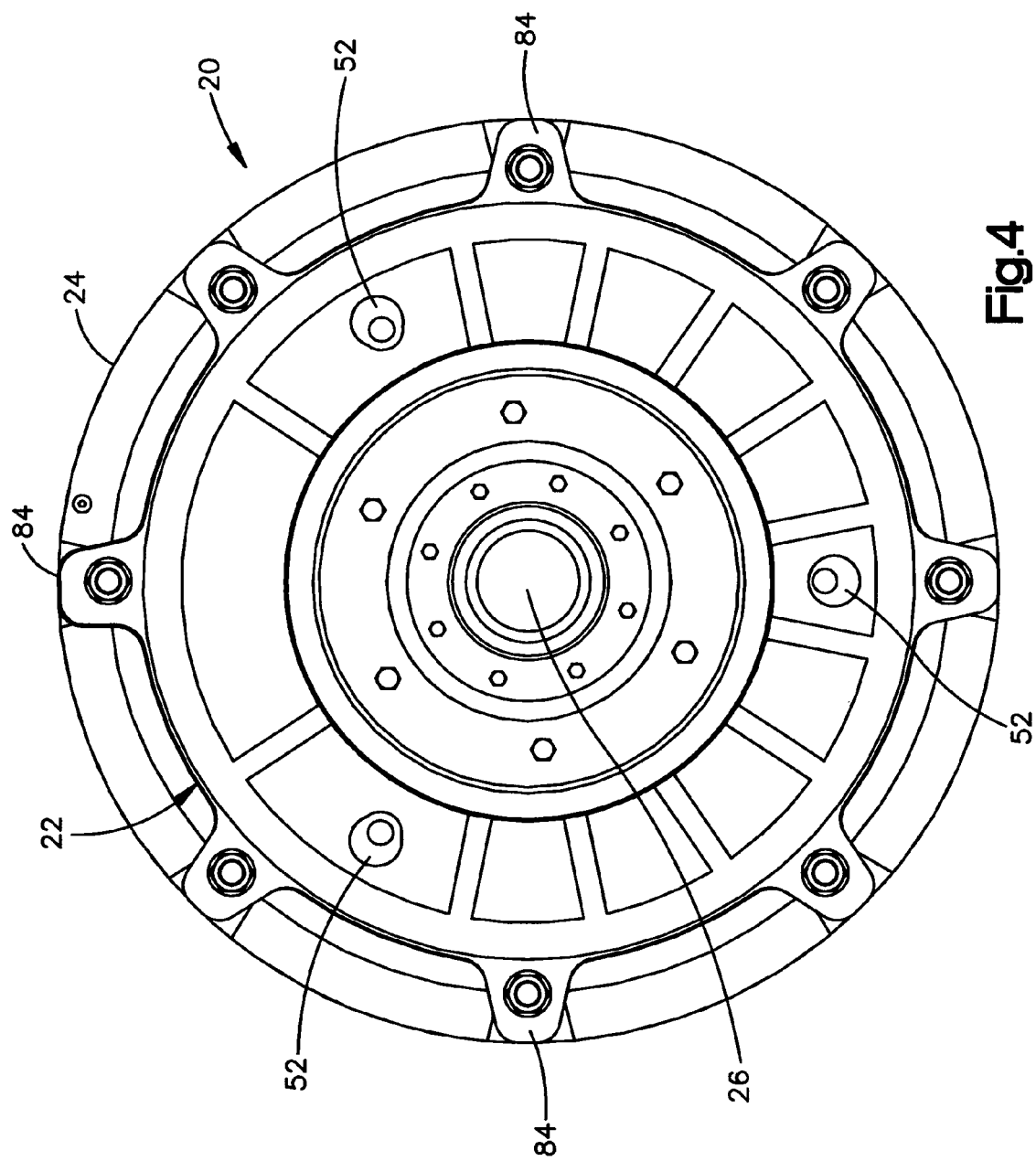
FIG. 4 is a frontal view of the annular brake assembly.

The annular brake assembly 20 as seen in FIGS. 2 and 3 basically comprises a mounting flange or base member 24, a housing 22 with the aforementioned components, and a rotor 36. The housing 22 includes the front and rear annular pressure plates 32, 34, one pressure plate on each side of the rotatable rotor 36, the array of springs 38, annular piston 40, and the cylinder or cover member 42. Aside from the rotor 36, these items make up the components of the housing 22 and are interconnected and in alignment with the mounting flange 24 with guide rods 44 and coaxially disposed clamp tubes 56 mounted in passages 46 on the outer edges of the components. It should be immediately apparent that the annular brake assembly 20 may be modified in alternate embodiments that can include a brake disc or a clutch disc in order to function as either a clutch or a brake. The rotor 36 is freely rotatable relative to the housing 22.

Cylindrical clamp tubes 56 positioned coaxially over the guide rods 44 are arranged to have one end 58 of the clamp tube 56 abut the rear annular pressure plate 34. The diameter of the passage 46 in the front annular pressure plate 32 is sized slightly larger than the passage 46 in the rear annular pressure plate 34 so as to slidably receive the clamp tube 56 therein. The opposite end 60 of the clamp tube 56 abuts against the annular piston 40 as best seen in FIG. 2. Return springs 62 are coaxially disposed on the clamp tubes 56 between the pressure plates 32, 34 and exhibit a spring force to facilitate and assist the axial movement of the pressure plate 32 and to cause the axial movement of pressure plate 34 when the brake assembly is in the disengaged condition. The spring constants of the return springs 62 and the coil springs 38 can be adjusted using relatively thick turns of wire or alternatively thinner wire to enable the desired amount of application force and return force to be used for the axial movement of the pressure plates 32, 34 in association with machines having different force or torque requirements.

The mounting flange 24 is cast as generally one cylindrical piece of metal and includes a plurality of passages 46 on its outer radial region. The passages 46 in the mounting flange 24 preferably include a stepped bore 64 with a decreasing diameter. Fastener collars 66 which threadably receive the guide rods 44 include a cap portion 68 for limiting the axial movement of the guide rods 44 within the stepped bores 64 a distance in both directions A and B sufficient to provide the clamping force on the rotor 36 and to release the clamping force. A cylindrical central opening or passage 26 extends through the mounting flange 24 for receiving the shaft 28.

Figure 6:
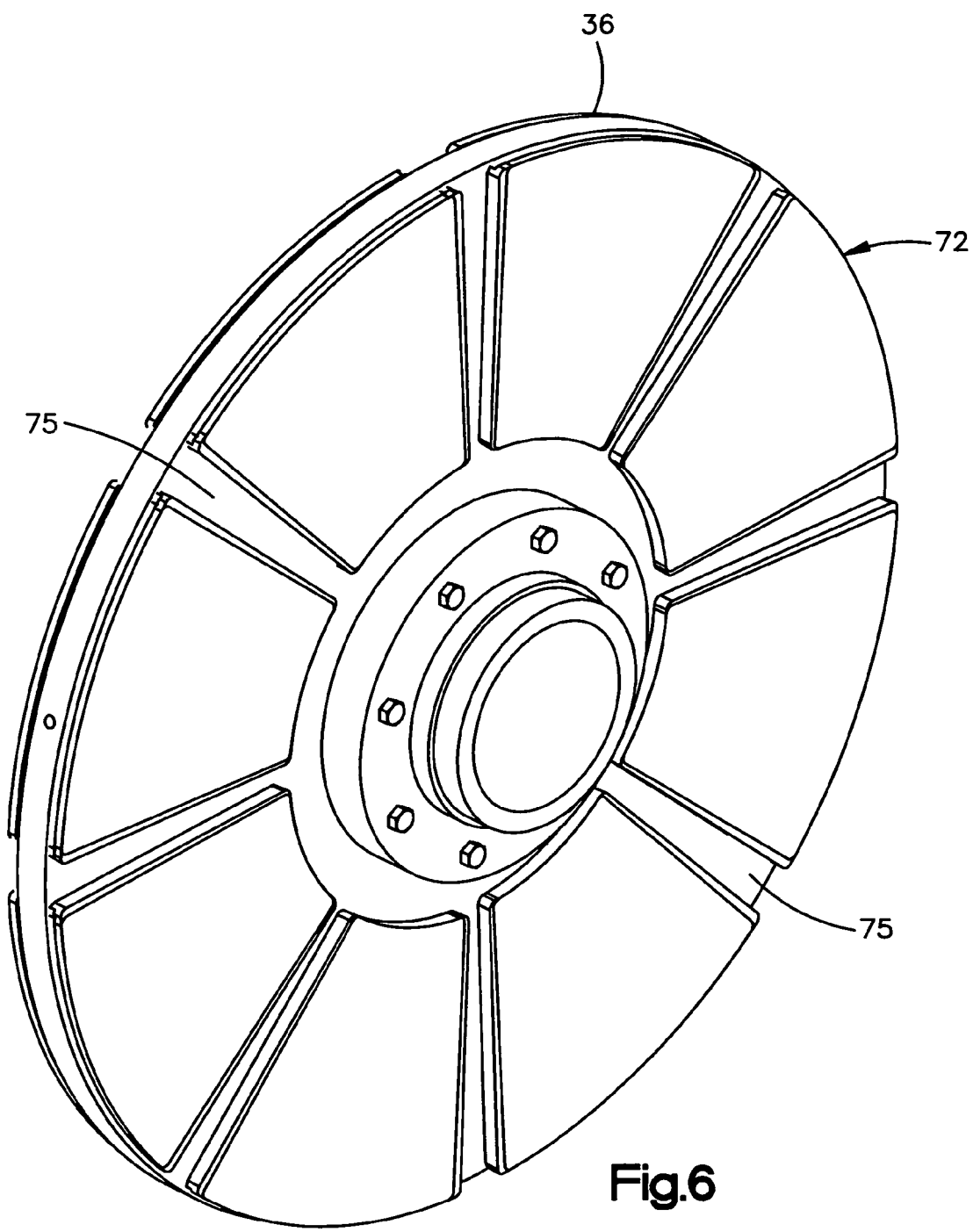
FIG. 6 s a perspective view of the rotor with the friction material disposed thereon.

The metal housing 22 includes front and rear annular pressure plates 32, 34 each cast as one generally cylindrical piece of metal. The pressure plates 32, 34 have a friction surface side disposed on the opposite sides of the rotor 36. Each friction surface side of the pressure plates 32, 34 includes a plurality of generally trapezoidal shaped indentations 70 radially arranged around the pressure plates 32, 34 with preferably each indentation including a retaining channel 71 within the indentation 70 for slidably receiving and holding correspondingly shaped friction pads 72. The generally trapezoidal shaped friction pads 72 are sized to slip within the openings 76 between the clamp tubes 56 for easy replacement without disassembling the brake assembly 20. The friction pads 72 are of a composite construction supported by a metal backing plate 74. The backing plate 74 may include openings 78 at an upper end for securing the friction pads with fasteners to mating openings 73 in the pressure plates 32, 34. The friction material making up pads 72 may include radially extending or annular grooves 75 to remove debris and particulates as well as function as visual indicators of wear. The front and rear annular pressure plates 32, 34 as best seen in FIG. 2 are disposed on each side of the rotor 36 in an arrangement that places the friction pads 72 on opposite sides of the rotor 36 and preferably cover at least approximately fifty percent of the working surface area on each side of the rotor 36 and more preferably at least approximately sixty-five percent of the working surface area on each side of the rotor 36. Even still more preferably an embodiment can cover approximately seventy-five percent of the working surface area on each side of the rotor 36. The friction material substantially covers the entire working surface area of the rotor 36. The working surface area is the available planar rubbing area on each side of the rotor from the outer diameter of the hub. Another embodiment of the present disclosure may include placing the friction pads 72 on both sides of the rotor 36 rather than on the pressure plates 32, 34 as shown in FIG. 6. Passages 46 are located in the plurality of shoulders 80 located on the outer radial edge of the front annular pressure plate 32 and are aligned with the passages 46 in the radial portion of the rear annular pressure plate 34 and those in the mounting flange 24. Passages 46 are sized to receive the guide rods 44. The diameter of the passages 46 in the rear annular pressure plate 34 has a size that accommodates only the diameter of the guide rods 44 whereas the diameter of the passages 46 in the front annular pressure plate 32 are sized to accommodate the cylindrical clamp tubes 56 coaxially positioned over the guide rods 44. One end 58 of the clamp tubes 56 abuts the rear annular pressure plate 34 and the other end 60 of the clamp tubes 56 abuts the annular piston 40. Return springs 62 are coaxially disposed on the clamp tubes 56 and facilitate the axial movement of the pressure plates 32, 34 in the engaged and disengaged conditions.

The housing 22 further includes an array of helical coil springs 38 constructed in a manner described in detail in U.S. patent application Ser. No. 11/590,199 filed Oct. 31, 2006, which is owned by the assignee of the present invention and hereby incorporated by reference. No detailed explanation of these springs is necessary here. Alternate embodiments may include any resilient biasing valves operable to axially move pressure plate 32 in the first and second directions, for example, electrically actuated or hydraulically actuated solenoid valves (not shown).

Figure 5:
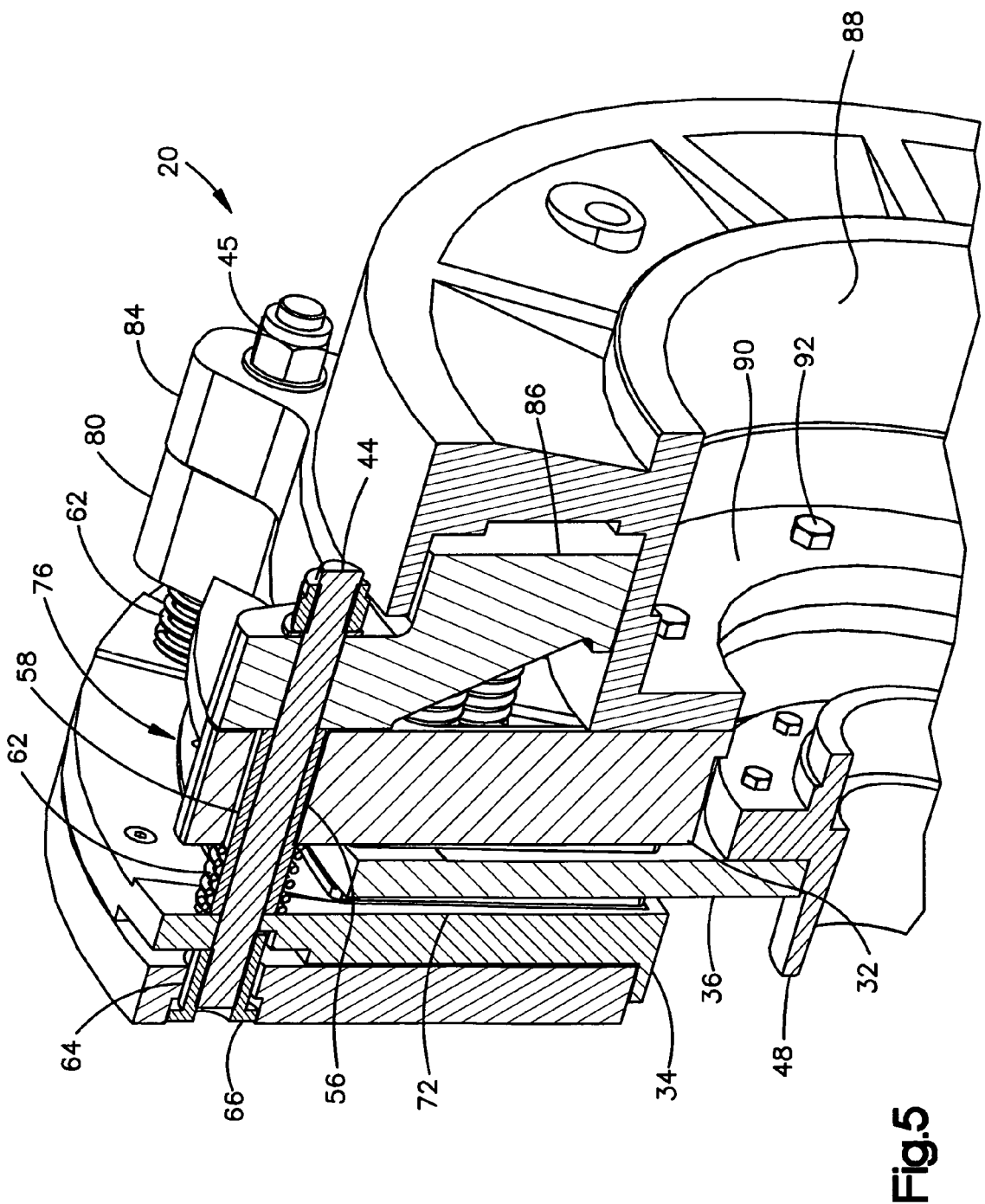
FIG. 5 is a partial sectional view of the annular brake assembly.

The housing 22 also includes the annular piston 40 which is generally cylindrical and may be cast as one piece of metal. Shoulders 84 on an outer radial edge of piston 40 have passages 46 aligned with the passages 46 in the shoulders 80 of the front annular pressure plate 32, and passages 46 in the rear annular pressure plate 34 and mounting flange 24. Passages 46 in the annular piston 40, like the passages 46 in the rear annular pressure plate 34, have a diameter that accommodates the diameter of the guide rods 44, but not the clamp tubes 56. Annular piston 40 includes a cylindrically shaped raised central portion 86 constructed to hold and retain the array of helical coil springs 38 as best shown in FIGS. 2 and 5. Annular piston 40, like pressure plates 32, 34 and mounting flange 24, includes the centrally located opening 26 for accommodating the rotatable shaft 28.

The cylinder or cover member 42 has a generally cylindrical shape and may be cast as one piece of metal. Cylinder 42 has a plurality of fluid connectors 52 on its front constructed for attachment to a pressurized fluid source, like air, for example. Fluid connectors 52 fluidly communicate through fluid passages 54 with the annular fluid chamber 43 for pressurization and evacuation. Cylinder 42 has a centrally located annular recess 88 with a lip 90 extending slightly radially inward. Lip 90 is attached with fasteners 92 to the front side of the front annular pressure plate 32. Stepped channel 94 on the back side of the cylinder 42 slidably engages the walls 87 of the raised portion 86 of the annular piston 40 to form the variable annular fluid chamber 43.

The force transmitting assembly 20 of the present disclosure finds many applications where force is necessary to engage or disengage a flywheel or rotatable shaft. Advantageously, the force transmitting assembly 20 provides an axially moveable housing with a fixed rotor 36 attached to a stationary mounting flange 24. The structure of the present disclosure eliminates the need for axial freedom of splined rotors that wear, cause imbalance, and are expensive to replace and manufacture. A significant advantage of the structure of the present disclosure is the maximization of torque and the minimization of inertia by having the friction material of friction pads 72 cover substantially all of the rotor surface 36.

The foregoing is illustrative of the present disclosure and is not intended to be construed as limiting thereof. Although a few exemplary embodiments of this disclosure have been described and shown, those skilled in this art will readily appreciate that many modifications are possible without departing from the novel teachings and advantages of this disclosure. Accordingly, all such modifications are intended be included within the scope of this disclosure as defined in the claims and their equivalents.

Having described the invention, the following is claimed:

1. An apparatus for transmitting force, comprising:
a stationary mounting flange having a central opening for receiving a shaft;
a rotor having a radial working surface and a centrally located opening fixedly mounted on the shaft and rotatable therewith, said rotor being held firmly in place to the shaft;
a front and a rear annular pressure plate disposed on opposite sides of said rotor and moveably attached to said mounting flange, said front annular pressure plate being axially moveable relative to said mounting flange in a first direction for releasing a clamping load on said rotor and in a second direction for applying the clamping load on said rotor, said rear annular pressure plate being axially movable in an opposite direction to said first direction of said front annular pressure plate for releasing the clamping load on said rotor, said rear annular pressure plate being axially movable in an opposite direction to said second direction of said front annular pressure plate for applying the clamping load on an opposite side of said rotor;
an annular piston moveably connected to said front annular pressure plate, said annular piston being axially moveable in said first direction; and
an annular cylinder connected to said front annular pressure plate and axially moveable therewith, said annular cylinder having an annular channel constructed for engagement with a raised portion of said annular piston together forming a variable volume annular fluid chamber, said annular cylinder and said front annular pressure plate being axially moveable in the first direction under the influence of fluid pressure applied to said annular cylinder and annular piston from the variable volume annular fluid chamber to press said front annular pressure plate against an urging counterforce supplied by an array of helical coil springs disposed between said annular piston and said front annular pressure plate for releasing the clamping load of said front annular pressure plate against said rotor, a plurality of return springs causing axial movement of said rear annular pressure plate in an opposite direction to said front annular pressure plate for releasing the clamping load against said rotor, said front annular pressure plate being movable in the second direction by said urging counterforce of said array of helical coil springs for applying the clamping load on said rotor, said rear annular pressure plate applying the clamping load from the opposite direction, wherein said axially moveable front and rear annular pressure plates, said array of helical coil springs, said annular piston and said annular cylinder are axially moveable components making up a floating housing.

2. An apparatus as set forth in claim 1 further comprising a plurality of friction pads on a friction surface of said front and rear pressure plates sufficient to substantially cover said working surface of said rotor.

3. An apparatus as set forth in claim 2 wherein each of said friction pads have generally a trapezoidal shape removably attached to said front and rear annular pressure plates.

4. An apparatus as set forth in claim 2 wherein each of said friction pads have generally a trapezoidal shape and are removably attached to said rotor.

5. An apparatus as set forth in claim 1 wherein said mounting flange, said front and rear pressure plates, and said piston are interconnected with guide rods through aligned passages on an outer edge.

6. An apparatus as set forth in claim 5 further including a plurality of clamp tubes coaxially situated on said guide rods between said rear pressure plate and said piston for facilitating the application and release of the clamping load on the rotor.

7. An apparatus as set forth in claim 1 further including return springs coaxially disposed on said clamp tubes between said front and rear pressure plates for assisting release of the clamping load on said rotor.

8. An apparatus as set forth in claim 7 further comprising a plurality of generally trapezoidal shaped friction pads each sized to be removably replaced through openings between said clamp tubes.

9. An apparatus as set forth in claim 1 further including a hub fastened to said rotor for receiving the shaft.

10. An apparatus as set forth in claim 1 further comprising a plurality of friction pads disposed on said rotor.

11. An apparatus as set forth in claim 1 wherein said rotor comprises an annular rotor with an annular gap with reinforcement ribs.

12. An apparatus as set forth in claim 1 wherein said rotor comprises an annular rotor with a plurality of openings therethrough.

13. An apparatus as set forth in claim 1 wherein said rotor comprises both an annular gap with a reinforcement ribs and a plurality of openings therethrough.

* * * * *